Patented Mar. 28, 1933

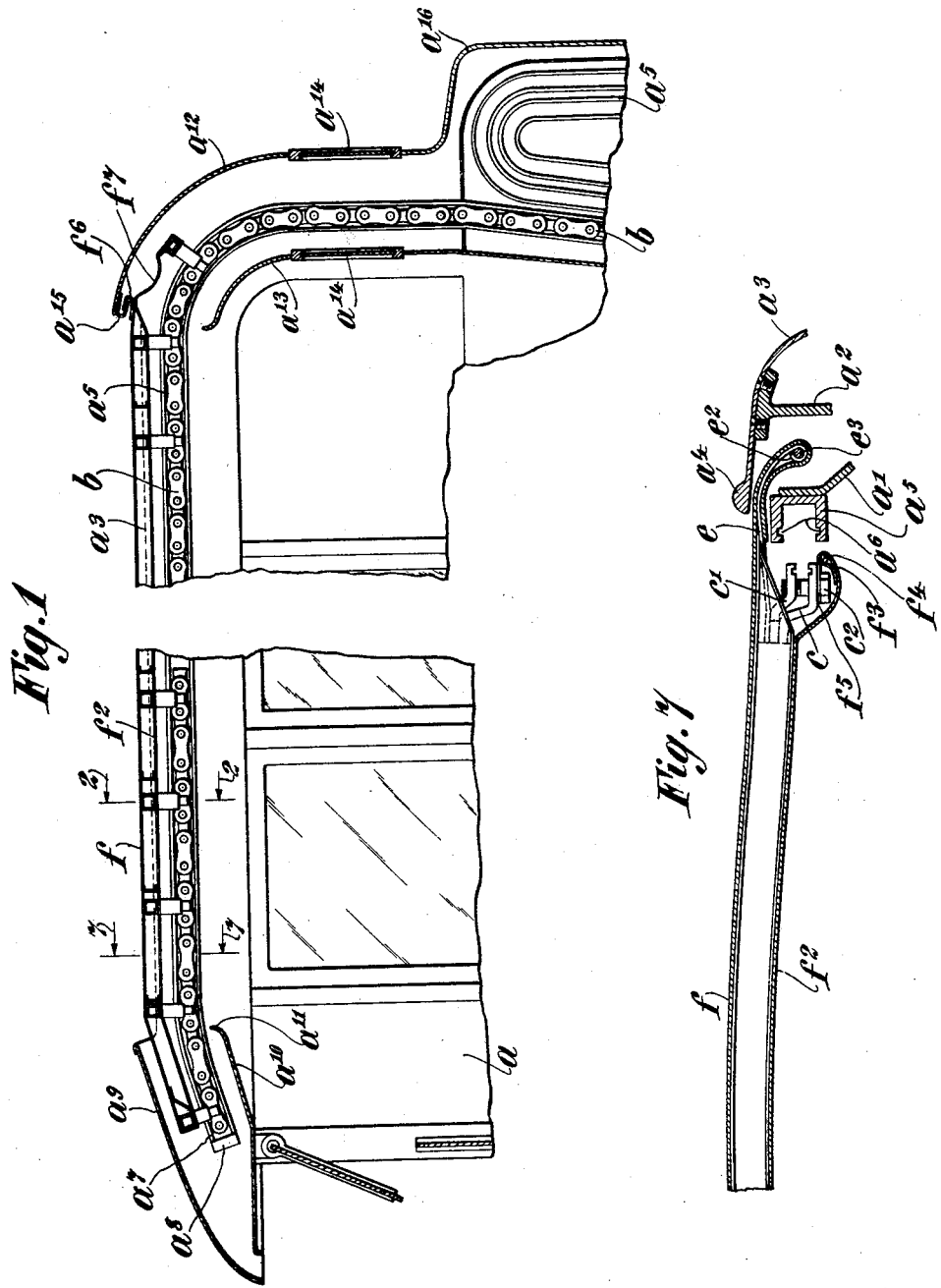

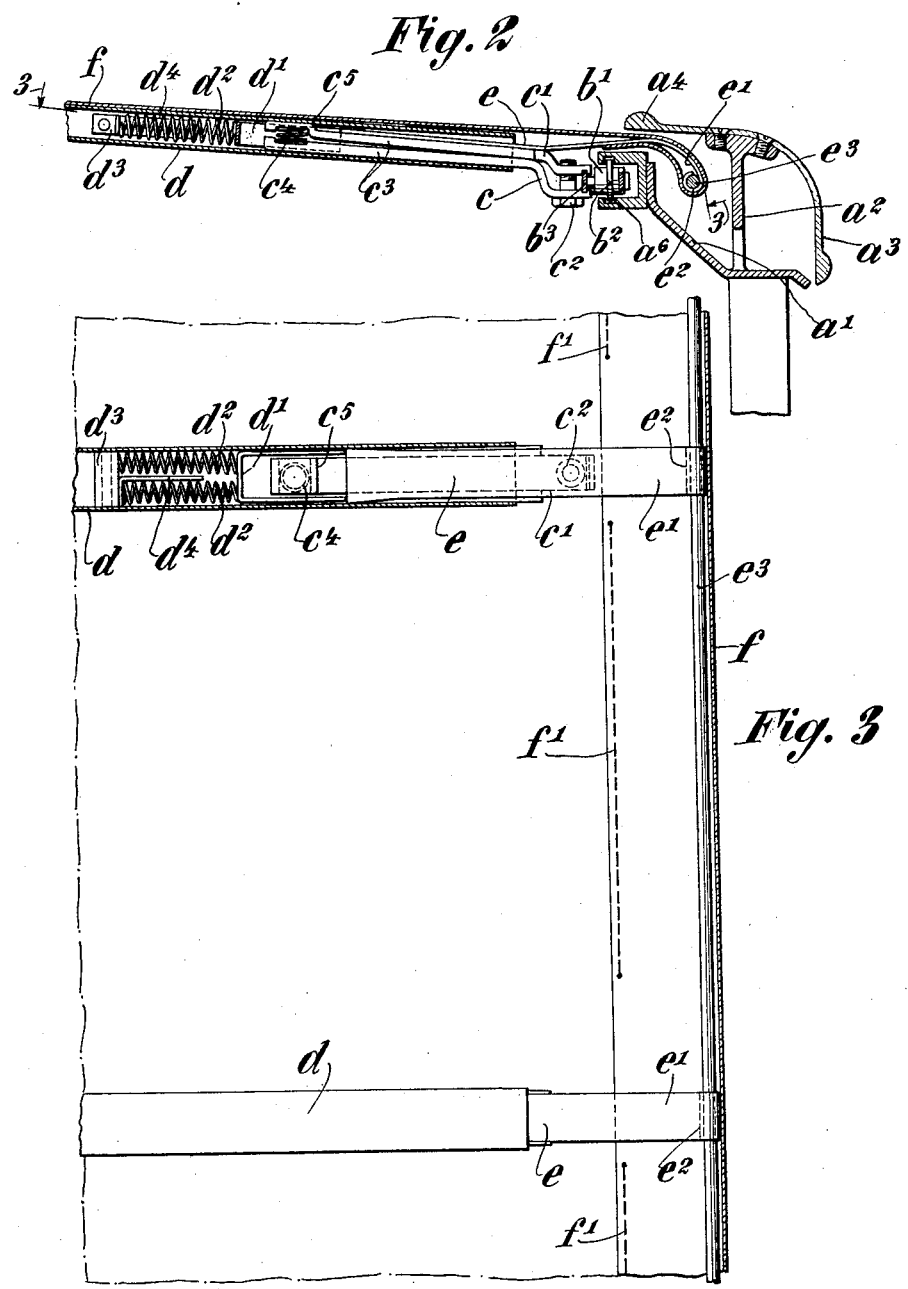

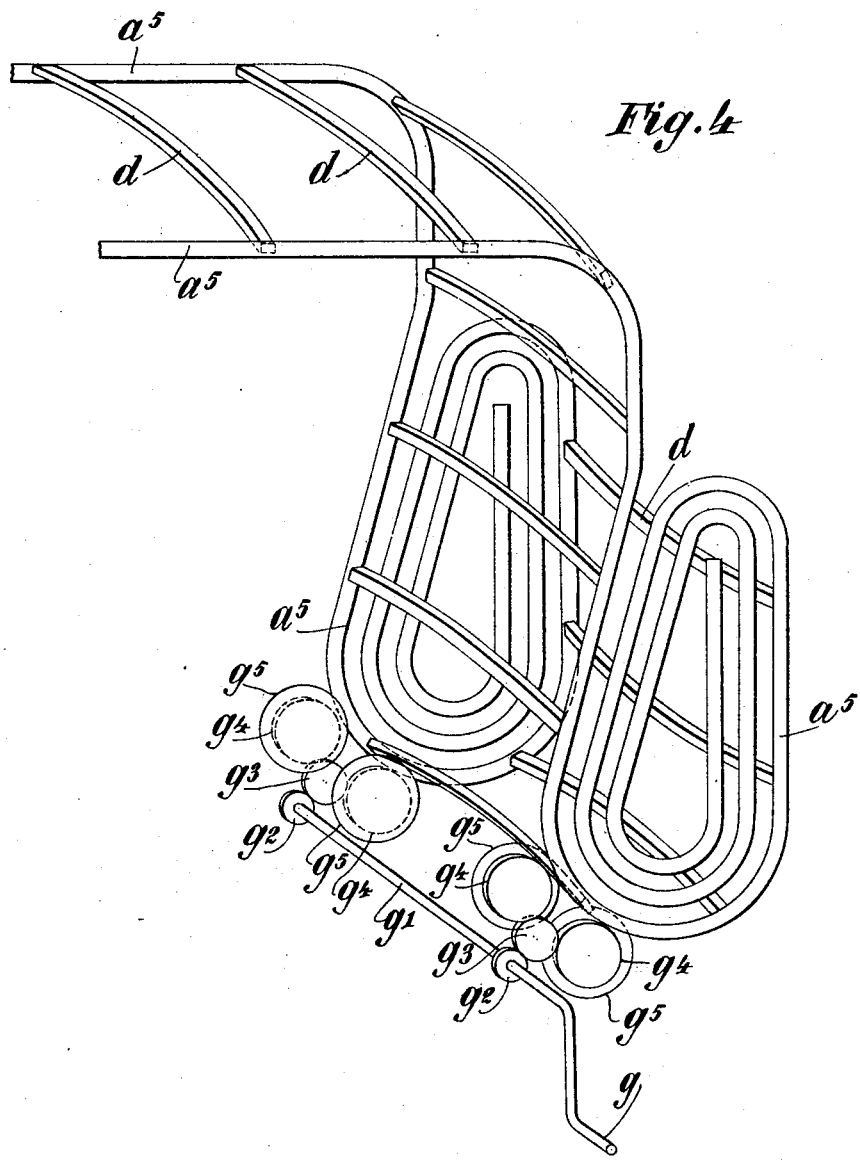

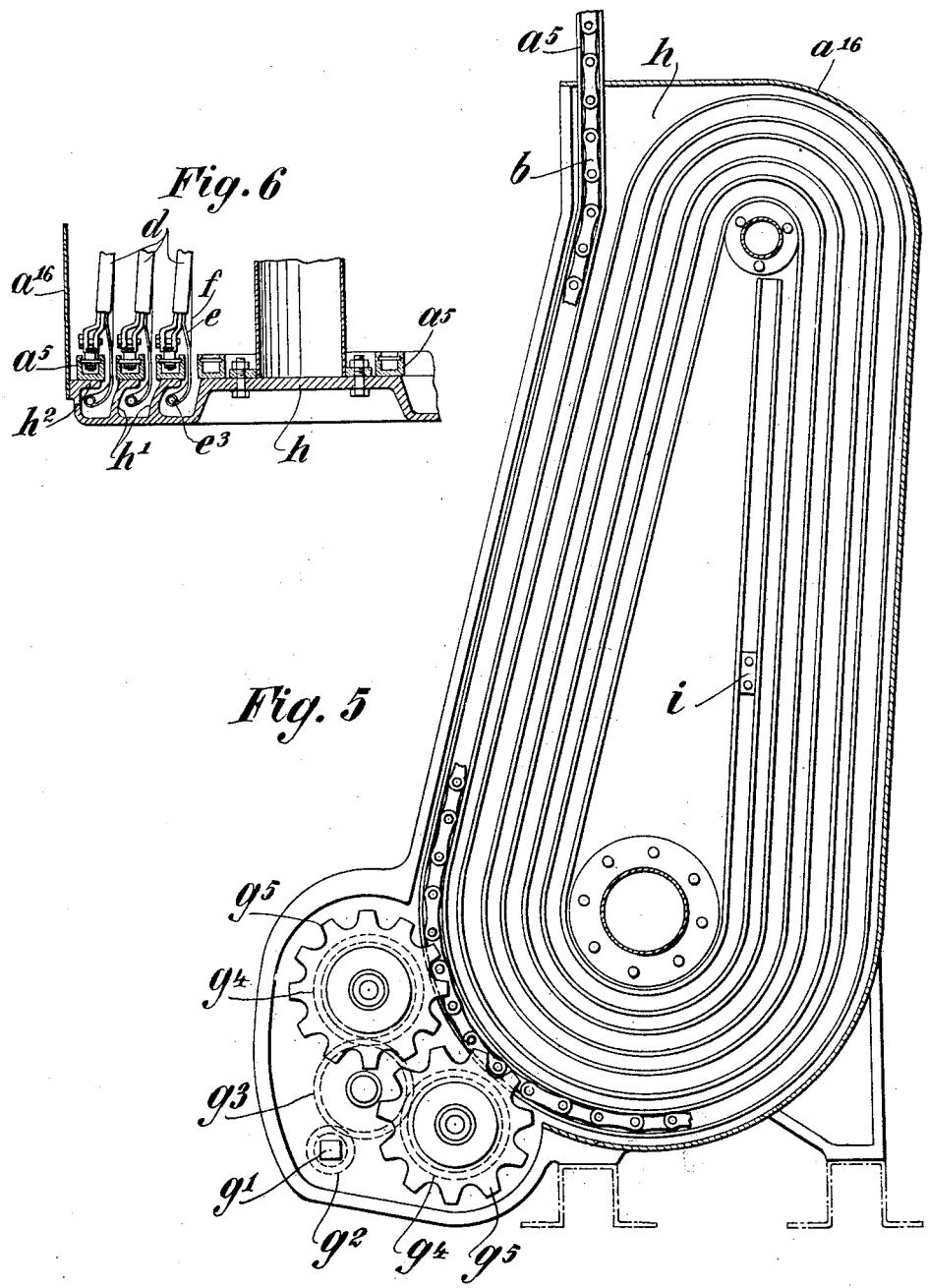

1,903,240

UNITED STATES PATENT OFFICE

HEINRICH MAYER, OF ARBON, SWITZERLAND, ASSIGNOR TO SOCIÉTÉ ANONYME ADOLPHE SAURER, OF ARBON, SWITZERLAND, A CORPORATION OF SWITZERLAND

CONVERTIBLE VEHICLE TOP

Application filed December 4, 1930, Serial No. 499,896, and in Germany June 17, 1930.

The present invention relates to tops for motor vehicles and embodies, more specifically, an improved convertible top which may be moved into a retracted position to afford a partially open car and into an extended position to form a closure over the body of the car.

More particularly, the invention comprises an improved form of convertible top for a motor vehicle which forms a complete and effective closure for the body thereof, the closure mounting and operating means being of such character as to actuate the same effectively and enable the closure to be housed in a minimum of space.

Although various forms of convertible tops have been provided for motor vehicles with a view to simulating the weather-tight construction of a closed body of the permanent type when the convertible top member is moved into a closed position, the cumbersome nature of the convertible top has rendered it extremely difficult to house conveniently in a comparatively small space. It will be obvious that to roll the top in the manner of a window-shade upon its roller, the top must not be bowed as is highly desirable in service. Furthermore, there has been no provision for tensioning the top transversely of the vehicle without exerting disturbing stresses upon the means for securing the sides of the top to the body of the vehicle. Further disadvantages in existing forms of convertible tops have rendered them unsatisfactory and prevented their being used generally.

With a view to overcoming the foregoing disadvantages and providing a highly serviceable convertible top structure, the present invention has for an object to provide a convertible top which is simple in construction and operation, the parts thereof being effectively mounted in position and the operation thereof being such as to prevent the failure or improper functioning of the mechanism.

A further object of the invention is to provide a device of the above character wherein the convertible top is readily moved into a nested or housed position within a minimum of space, the top, when so retracted, being moved into an extended or closed position by a simple operation.

A further object of the invention is to provide an improved top wherein means is incorporated for tensioning the top transversely thereof.

A further object of the invention is to provide, in a top of the above character, a means for limiting the movement of the top to its closed position whereby the top is tensioned longitudinally.

A further object of the invention is to provide a means for forming a weather-tight connection between the sides of the convertible top and the stationary portions of the body of the vehicle.

Further objects, not specifically enumerated above, will be apparent as the invention is described in greater detail in connection with the accompanying drawings, wherein:

Figure 1 is a view in vertical section, taken longitudinally of a vehicle provided with a top constructed in accordance with the present invention, the top being shown in its extended or closed position.

Figure 2 is a view in section, taken on line 2—2 of Figure 1, and looking in the direction of the arrows.

Figure 3 is a view in section, taken on line 3—3 of Figure 2, and looking in the direction of the arrows.

Figure 4 is a view in isometric projection showing the frame work of a top constructed in accordance with the present invention and mounted in a partially nested position.

Figure 5 is a view in side elevation showing the housing tracks and operating mechanism constructed in accordance with the present invention.

Figure 6 is a detail view in section, taken through the housing for the top and showing the manner in which the same is nested in a retracted position.

Figure 7 is a view in section, taken on line 7—7 of Figure 1, and looking in the direction of the arrows.

Referring to the above drawings, $a$ indicates the closed sides of a vehicle body which extend upwardly and terminate in side members $a'$ and $a^2$. An outer protective member $a^3$ is secured to the member $a^2$ and terminates in a longitudinal body $a^4$ which is adapted to overlie a top to be described hereinafter.

The inner member $a'$ has mounted thereon a longitudinal U-shaped track $a^5$ within which spaced grooves $a^6$ are formed. This track slants downwardly at the forward end of the body as shown at $a^7$, a stop $a^8$ being provided to limit the movement of the convertible top.

A forward top supporting member is provided in the form of an outer cowl $a^9$ and an inner cowl $a^{10}$, the end of the latter being curved upwardly as at $a^{11}$ to catch any water which might be directed between the cowls. It will be seen from Figure 1 that the outer cowl $a^9$ preferably is formed as a continuation of the outer side portion $a^3$ and, in a similar fashion, the same portion curves rearwardly into an outer back wall $a^{12}$ and an inner back wall $a^{13}$ which serve as an after top supporting member. Windows $a^{14}$ are provided in the inner and outer back walls and a transverse hook-shaped piece $a^{15}$ cooperates with a similarly formed piece on the convertible top to limit the movement of the latter into its extended position, at the same time serving as an effective weathertight connection between the top and the outer back member $a^{12}$.

At the rear of the body, the outer back wall $a^{12}$ terminates in a housing $a^{16}$. From Figure 1, it will be seen that the longitudinal channels $a^5$ curve downwardly and extend between the back walls $a^{12}$ and $a^{13}$ terminating in a series of nested concentric tracks within the housing $a^{16}$. Block chains $b$ are adapted to be received within the channels, these chains being formed with rollers $b'$ (Figure 2) having circular flanges $b^2$ for engaging the grooves $a^6$. The rollers $b'$ space the links of the chain, the inner links $b^3$ of which are engaged by clamps $c$ and $c'$. A bolt $c^2$ causes the clamps to engage the said inner links, and extensions $c^3$ are formed on the clamps and spaced apart at their ends by springs $c^4$.

A plurality of hollow tubular spacers or struts $d$ are mounted over the ends $c^3$ of pairs of the oppositely extending clamps and thus receive the latter in such manner that relative movement may take place between the respective elements. Upon the extensions $c^3$ of the upper clamp members $c'$, shoulders $c^5$ are formed, thus spacing the extension of the top from the respective tubular members $d$. U-shaped spacing members $d'$ are mounted over the ends of the extensions $c^3$ and are urged outwardly by means of pairs of springs $d^2$ which seat against transverse members $d^3$, secured within the tubular spacers $d$. Partitions $d^4$ are preferably mounted upon the seat $d^3$ and serve to maintain the springs in proper relationship, as will be clearly seen from Figure 3.

The outward thrust of the U-shaped member $d$ is received by a metallic strip $e$ which is bowed at its outer end $e'$ and terminates in an eye $e^2$. A cable $e^3$ is threaded through the aligned eyes of the tensioning strips $e$ of the respective spacers and thus serves as a convenient means for applying a transverse tension to the top member $f$ which is preferably turned back over the cable $e^3$ and stitched at $f'$ to form a longitudinal seam at the opposite sides of the top. At spaced intervals, the stitching $f'$ is interrupted to permit relative movement of the top with respect to the spacing members and tensioning strips $e$. This will be clearly seen in Figure 3.

If desired, the inner side of the top may be provided with a fabric lining $f^2$ which may be turned back to form a seam $f^3$ at the sides thereof, a positioning cable or stiffening member $f^4$ being mounted in the seam and secured to the respective clamps $c$ and $c'$ by means of a strip $f^5$.

In order that the top may be conveniently moved into an extended or retracted position, a manually operable crank $g$ is journaled in the sides $h$ of the housing $a^{16}$, these sides being preferably formed with partition members $h'$ which form a continuous nested groove within which the outer top member and cables $e^3$ are received. The partition members are further provided with bearing surfaces $h^2$ upon which the continuations of the channels $a^5$ are mounted. Crank $g$ thus operates a shaft $g'$ having driving gears $g^2$ which engage idler pinions $g^3$. Idler pinions $g^3$ engage gears $g^4$ having cog teeth $g^5$ which are adapted to engage the respective chains to cause the same to be slid in the channels $a^5$. If desired, an adjustable limiting stop $i$ may be mounted adjacent the extremity of the channels to limit the retracting movement of the top within the housing. By forming the forward extremity of the channels with a downward slant, the top is tensioned when moved into the closed position as shown in Figure 1. In this position, the chains serve as compression members in a manner which will be well understood and the rearward portion of the top $f$ is provided with a transversely extending hook-shaped member $f^6$ which engages the transverse member $a^{15}$ to enable the top to be tensioned longitudinally. The top terminates in a comparatively loose portion $f^7$, thus enabling the hook-shaped member $f^6$ to be mounted intermediate the ends of the top to permit a slight adjustment in the effective length thereof.

The tubular spacing members, together with the lateral tensioning strips serve as an effective mounting, spacing and tensioning means for the top, the tension exerted upon the top being entirely independent of the mounting of the spacing members upon the chains and channels. In this fashion, the tension is equalized and exerted entirely upon the top without exerting lateral stresses upon the chains and rollers to disturb the mounting of the top.

By nesting the channel members within the housing as described above and shown in Figures 4 and 5, the top may be bowed and at the same time conveniently stored within the housing in a minimum of space. When the top is moved to and from a closed position all portions thereof are actuated and the top thus effectively moved into a desired position. When the top is in a closed position, the rear vision through the windows $a^{14}$ is not disturbed, inasmuch as the top is above such windows. In like manner, such vision is not disturbed when the top is housed since the top at such time lies below the windows. An effective weather-tight connection is afforded at all times between the sides and ends of the top and the stationary portions of the body of the vehicle and, when the top is in its closed position, the vehicle body resembles closely bodies of the permanent type.

While the invention has been described with specific reference to the accompanying drawings, it is not to be limited, save as defined in the appended claims.

I claim as my invention:

1. In combination with a motor vehicle body having fore and aft top supporting members, a flexible top, guide means for the top at each side of the body, a plurality of guide engaging means movable in each guide, bowed spacing means mounted between the opposed guide engaging means in the respective guides, said spacing means having recessed portions in the opposite ends thereof, tensioning strips extending outwardly from the recessed portions, means to secure the sides of the top to the tensioning strips, means to mount the spacing means movably with respect to the guide engaging means, and means to urge the tensioning strips outwardly from the sides of the spacing means.

2. In combination with a motor vehicle body having fore and aft supporting members, a flexible top, guide means for the top at each side of the body, a plurality of guide engaging means movable in each guide, bowed spacing means mounted between the opposed guide engaging means in the respective guides, said spacing means having recessed portions in the opposite ends thereof, tensioning strips extending outwardly from the recessed portions, cables passing through the ends of the tensioning strips, means to secure the sides of the top over the cable, means to mount the spacing means movably with respect to the guide engaging means, and springs in the recesses to urge the tensioning strips outwardly from the sides of the spacing means.

3. In combination with a motor vehicle body having fore and aft top supporting members, a flexible top, guide means for the top at each side of the body, means movable in each guide, clamps engaging the guide engaging means, tubular spacing means mounted between the opposed guide engaging means in the respective guides, said clamps being slidably mounted in the tubular spacing means, tensioning strips extending outwardly from the ends of the spacing means, cables secured to the respective ends of the tensioning strips, means to mount the spacing means movably with respect to the guide engaging means, U-shaped members slidably mounted in the spacing members and engaging the tensioning strips, the clamps being received between the ends of the U-shaped members, and springs engaging the U-shaped members to urge the same outwardly.

4. In combination with a motor vehicle body having fore and aft top supporting members, a flexible top, guide means for the top at each side of the body, a plurality of guide engaging means, spacing members movably mounted upon opposed guide engaging members, tensioning means mounting the top movably on the spacing means, a flexible lining secured to the spacing means on the opposite side from the top, and means carried with the guide engaging means to position the sides of the lining with respect thereto.

5. In combination with a motor vehicle body having fore and aft top supporting members, a flexible top, guide means for the top at each side of the body, flexible longitudinally resistant to compression, means to secure the top in spaced relation to the guide engaging means, means at the after portion of the top to engage the top supporting members of the body to limit the movement thereof, and downward curves in the forward ends of the guides to tension the top longitudinally and place the guide engaging means in compression.

6. In combination with a motor vehicle body having fore and aft top supporting members, a flexible top, guide means for the top at each side of the body, flexible longitudinally resistant to compression, means to secure the top in spaced relation to the guide engaging means, said means spacing the top above the guide, means at the after portion of the top to engage the top supporting members of the body to limit the movement thereof, and downward curves in the forward ends of the guides to tension the top longitudinally and place the guide engaging means in compression.

This specification signed this 17th day of November A. D. 1930.

HEINRICH MAYER.